Figure 1:
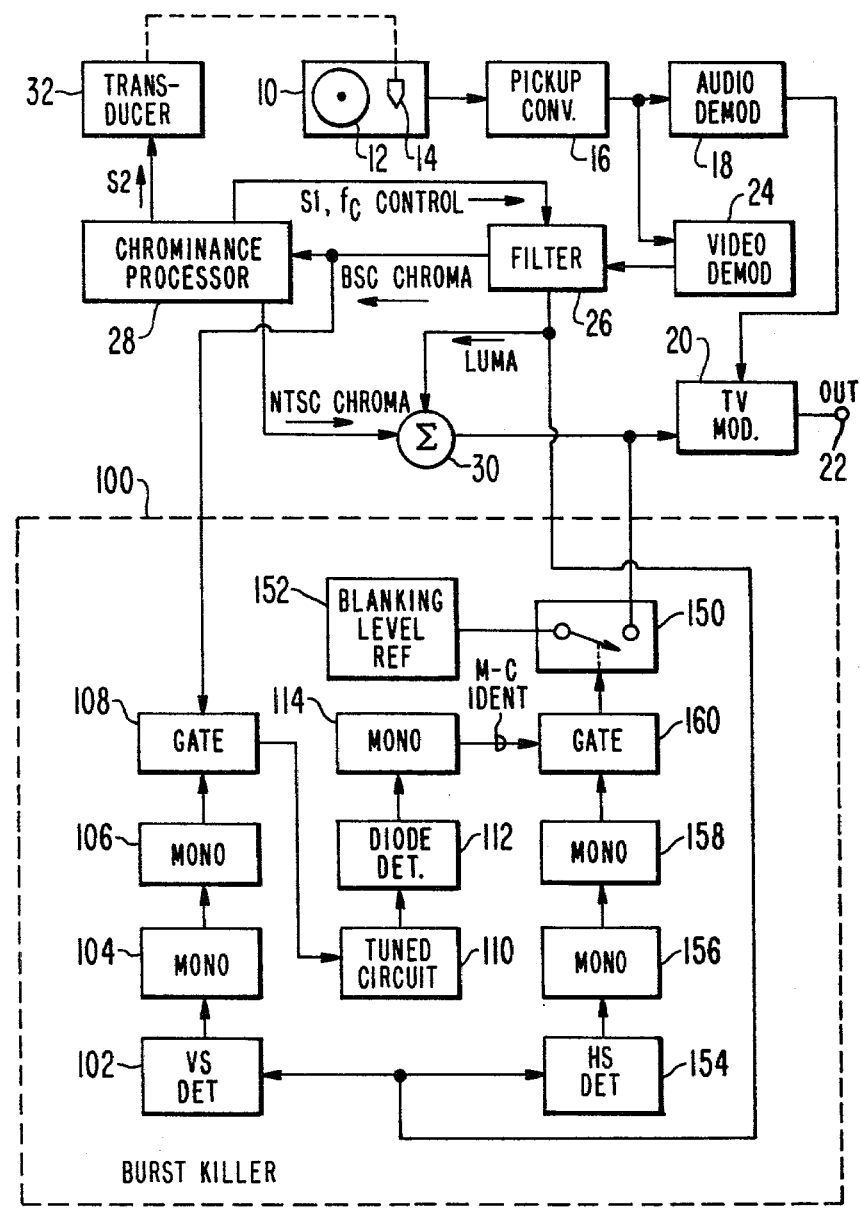

United States Patent [19]

Wharton

[11] 4,357,628
[45] Nov. 2, 1982

[54] VIDEO DISC PLAYER WITH BURST REMOVER

[75] Inventor: James H. Wharton, Indianapolis, Ind.
[73] Assignee: RCA Corporation, New York, N.Y.
[21] Appl. No.: 190,080
[22] Filed: Sep. 23, 1980
[51] Int. Cl.³ .................. H04N 5/76; H04N 9/49; H04N 5/79
[52] U.S. Cl. .................. 358/317; 358/322; 358/326; 358/26
[58] Field of Search .................. 358/4, 8, 21 V, 26, 358/128.5, 128.6, 147; 360/27, 36

[56] References Cited

U.S. PATENT DOCUMENTS

| | | | |
|---|---|---|---|
| 4,041,526 | 8/1977 | Kaneko | 358/26 X |
| 4,164,750 | 8/1979 | Hosoya | 358/26 |
| 4,195,309 | 3/1980 | Christopher et al. | 358/31 |
| 4,209,800 | 6/1980 | Yamamitsu et al. | 358/26 X |
| 4,275,416 | 6/1981 | Dieterich | 358/147 |
| 4,286,281 | 8/1981 | Suzuki | 358/147 X |
| 4,286,290 | 8/1981 | Pyles et al. | 358/128.5 |
| 4,308,557 | 12/1981 | Dieterich | 360/33 X |
| 4,314,273 | 2/1982 | Amery | 358/11 |

OTHER PUBLICATIONS

British Patent No. 1,512,100, "Control of Automatic Color Control and Color Killer Circuits in Video Signal Reproducing Apparatus", published May 24, 1978.

Primary Examiner—Aristotelis M. Psitos
Attorney, Agent, or Firm—E. M. Whitacre; J. S. Tripoli; R. G. Coalter

[57] ABSTRACT

A video disc player includes color burst responsive processing circuitry. A burst killer effectively removes burst from the player output when reproducing monochrome program material whereby an improved quality monochrome picture may be obtained from a color television monitor which may be used with the player. The burst killer is controlled on a field-by-field basis in response to an analog or digital signal manifestation of the reproduced video signal whereby the burst killer is automatically enabled and disabled during reproduction of mixed monochrome-color program material.

10 Claims, 2 Drawing Figures

VIDEO DISC PLAYER WITH BURST REMOVER

This invention relates to video reproducer apparatus and particularly to video disc players of the type in which the color burst component of a recovered video signal is utilized in processing the recovered signal for application to a television receiver.

Video disc players in which the color burst component of a recovered video signal is utilized to control processing functions such as time base correction of the chrominance signal, velocity error correction and comb filter center frequency control, are known. For example, in U.S. Pat. No. 3,965,482 (T. W. Burrus) a player is disclosed in which errors in the disc-pickup relative velocity and errors in the chrominance frequency are corrected by means of a single two-loop servo system. It includes a color burst keyed phase detector which produces a composite error signal representative of phase and frequency errors between the output of an NTSC reference frequency crystal oscillator and the color burst component of the chrominance output signal produced by a video converter. A filter separates the composite error signal into two component error signals. One of the component error signals is applied to a stylus tangential position control transducer (known as an "arm stretcher") to form a principal feedback loop for minimizing velocity errors of the pickup stylus relative to the surface of the disc. By this means frequency errors in both the chrominance and luminance components of the composite video output signal (due, for example, to disc warpage or eccentricity) are minimized. The other component of the composite error signal is applied to a voltage controlled oscillator which forms part of a herterodyning circuit in the video converter. The auxiliary feedback loop thus formed (which is nested within the principal feedback loop) provides minimization of phase and frequency errors in the chrominance component of the composite video output signal.

As another example, U.S. Pat. No. 3,996,606 entitled "COMB FILTER FOR VIDEO PROCESSING" which issued to D. H. Pritchard, Dec. 7, 1976, discloses a video disc player including a color burst responsive video filter correction servo system. Color burst errors are detected and the resultant error signal is supplied to control the center frequency of a video signal comb filter circuit in the player to cause the center frequency of the filter to vary in consonance with frequency errors in the recovered video signal thereby maximizing filtering efficiency.

The present invention is directed to solving a newly discovered problem which may arise when video disc players of the general kind described are used with certain types of television receivers for reproducing certain kinds of program material. Specifically, it has been discovered that when such players are used with monochrome television receivers, the reproduced picture quality is excellent regardless of whether the program material is monochrome or color. Inconsistant results have been observed, however, when such players are used with color television receivers and the program material is all monochrome or a sequence of color and monochrome scenes. For some color television receivers, the quality of the monochrome scenes appears inferior to that which may be obtained with a monochrome receiver.

The cause of this new problem has been found to be related to the use of color burst in the player for video signal processing. The advantages of using burst as a servo reference signal are many and discussed in detail in the Burrus and Pritchard patents. Because of its servo control uses, however, burst cannot be deleted from the monochrome program material on the disc and so appears in the processed video output signal of the player (i.e., a burst signal is recorded for monochrome as well as color video signals). The presence of burst at the player output prevents activation of the "color killer" circuits of color television receivers during monochrome scenes. Color television sets which are precisely color balanced produce excellent quality monochrome pictures notwithstanding the presence of the burst signal. However, if the color balance of the receiver is poor, the resultant monochrome picture is likely to exhibit an incorrect "color temperature", i.e., monochrome scenes may appear tinted rather than being purely shades of gray.

A video disc player in accordance with the present invention includes a turntable means for rotating a video disc record and a signal processing means for recovering a video signal from the record and producing a processed video signal for application to a television receiver, the recovered video signal including a color burst component for both monochrome and color program information recorded on the record. Means in the signal processing means is responsive when activated for effectively removing the color burst component of the recovered video signal from the processed video signal. Activation is provided by means responsive to a horizontal synchronizing component of the recovered video signal and to a monochrome-color identification signal supplied thereto.

In accordance with another aspect of the invention, the monochrome-color identification signal is derived from an analog or a digital signal manifestation of the recovered video signal.

In accordance with yet another aspect of the invention, the signal manifestation is timed to occur during the vertical interval of the recovered video signal and the monochrome-color identification signal is generated for a time period inclusive of the active scan interval of at least one video field.

Figure 2:
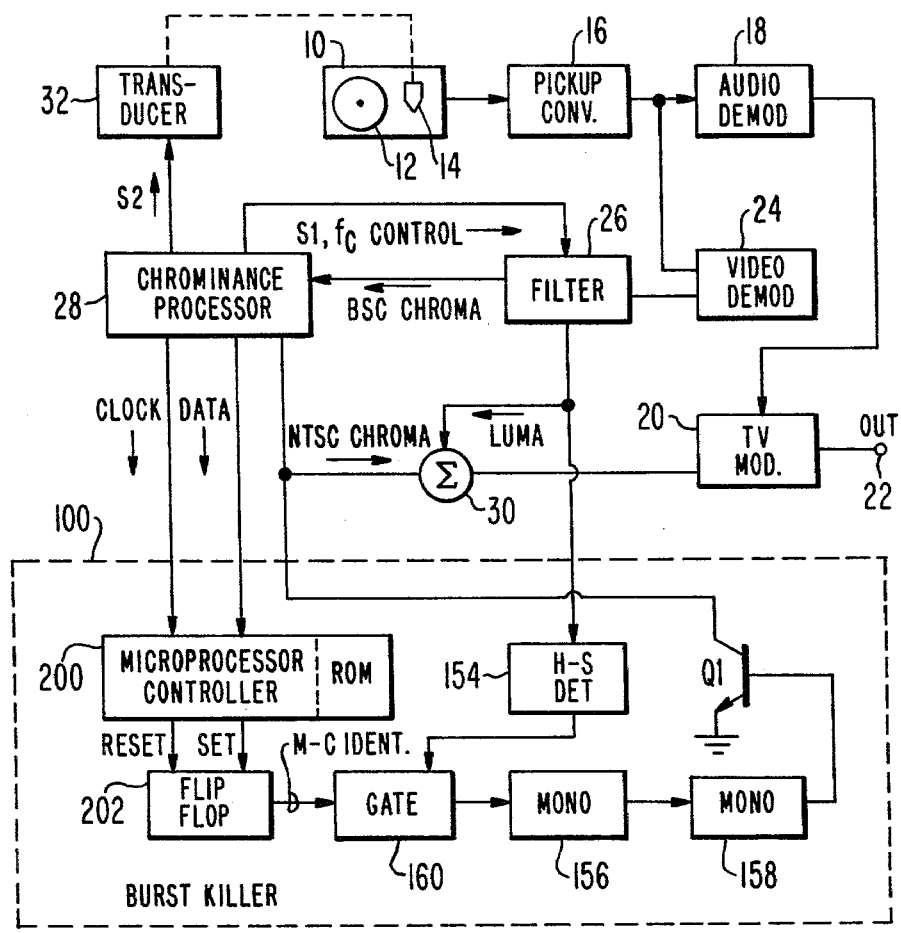

The invention is illustrated in the accompanying drawings wherein like elements are identified by like designators and in which:

FIGS. 1 and 2 are block diagrams, partially in schematic form, of video disc players embodying the invention.

The video disc player in FIG. 1 comprises a turntable 10 for rotating video disc 12 and a pickup transducer 14 for recovering information signals from the disc. Illustratively, it will be assumed that the player is intended for use with records in which information is stored in the form of topological variations and recovered by sensing capacitance variations between pickup transducer 14 and the record 12. The output of transducer 14 is coupled to the input of a pickup converter 16 which comprises a capacitance-to-voltage converter responsive to capacitance variations between a stylus in transducer 14 and the record being played for producing an FM output signal voltage representative of the recorded information. Such records and suitable circuits for implementing the capacitance-to-voltage conversion function of pickup converter 16 are well known. See, for example, U.S. Pat. No. 3,783,196 entitled "HIGH-DENSITY CAPACITIVE INFORMATION RECORDS AND PLAYBACK APPARATUS THEREFOR" which issued to T. O. Stanley, Jan. 1, 1974; U.S. Pat. No. 3,972,064 entitled "APPARATUS AND METHODS FOR PLAYBACK OF COLOR PICTURES/SOUND RECORDS" which issued to E. O. Keizer, July 27, 1976; and U.S. Pat. No. 3,711,641 entitled "VELOCITY ADJUSTING SYSTEM" which issued to R. C. Palmer, Jan. 16, 1973.

The output of converter 16 is applied to the input of an audio FM demodulator 18 which demodulates the audio FM portion of the recovered signal to baseband. The baseband audio signal is applied to the sound carrier modulation input of a TV modulator 20 which has an output terminal 22 for connection to the antenna terminals of a conventional television receiver. The video portion of the recovered signal is processed as will be described and applied to the baseband video input terminal of modulator 20 which produces video and sound carriers on a selected TV channel for reception by the television receiver. An integrated circuit suitable for use as TV modulator 20 and which may be selectively operated to produce output signals on channels 3 or 4, for example, is the model LM1889N "TV VIDEO MODULATOR" made by National Semiconductor Company, Inc.

Video FM demodulator circuit 24 converts the video FM signal produced by pickup circuit 16 to a baseband video output signal. For purposes of illustrating certain features of the invention, it will be assumed that the video signals recorded on the disc are in the previously mentioned "buried subcarrier" (BSC) format rather than the conventional NTSC format. However, the chrominance component in the BSC format is not located in the high end of the luminance signal video band, as in NTSC, but rather is buried in a lower portion of the video band. An illustrative buried subcarrier frequency choice is in the vicinity of 1.53 MHz, with the color subcarrier side bands extending ±500 KHz thereabout and, with the luminance signal band extending well above the highest color subcarrier frequency (to 3 MHz, for example).

FM demodulator 24 (and also audio demodulator 18) illustratively may be of the pulse counting type or of the phase-lock-loop (PLL) type. A suitable pulse counting type FM demodulator is disclosed in U.S. Pat. No. 4,038,686 entitled "DEFECT DETECTION AND COMPENSATION" which issued to A. L. Baker July 26, 1977. An FM demodulator of the phase-lock-loop type is described in U.S. Patent Application, Ser. No. 948,013 of T. J. Christopher et al., entitled "FM SIGNAL DEMODULATOR WITH DEFECT DETECTION" which was filed Oct. 2, 1978.

The composite video signal produced by demodulator 24 is separated into a buried subcarrier (BSC) chrominance component and a luminance component by means of filter 26 which, preferably, is a comb filter of the variable center frequency type. A suitable variable center frequency comb filter is described in U.S. Pat. No. 3,996,606. A preferred filter is described in the U.S. Patent application of T. J. Christopher and L. L. Tretter entitled "VIDEO PROCESSING SYSTEM INCLUDING COMB FILTERS" Ser. No. 966,512 filed Dec. 4, 1978 and now U.S. Pat. No. 4,195,309. Another example is disclosed in U.S. Pat. No. 3,996,610 entitled "COMB FILTER APPARATUS FOR VIDEO PLAYBACK SYSTEMS" which issued Dec. 7, 1976, to H. Kawamoto. The purpose of separating luminance and chrominance components of the recovered video signal by a comb filter having a controllable center frequency is to maximize filtering efficiency as previously explained.

The chrominance signal produced by filter 26 is converted from buried subcarrier format (e.g., 1.53 MHz) to NTSC format (e.g., 3.58 MHz) by means of chrominance processor 28 and the converted chrominance signal is then combined with the luminance signal produced by filter 26 by means of summing circuit 30. The resultant NTSC standard composite video signal is then applied to the video input terminal of modulator 20, as previously mentioned, to provide modulated picture and sound carrier waves to terminal 22.

Processor 28 is of the color burst locked heterodyne conversion kind as disclosed, for example, in the previously discussed Burrus and Pritchard U.S. Pat. Nos. 3,965,482 and 3,996,606, respectively. The processor includes color burst error detection circuitry for varying the frequency of a heterodyne conversion oscillator in a sense to minimize chrominance timebase errors and for generating a comb filter center frequency control signal S1 and a velocity control signal S2. The signal S1 is applied to filter 26 for varying the center frequency thereof as described in the Pritchard Patent. The signal S2 is applied to transducer 32 which is mechanically coupled to the player pickup transducer 14 for controlling the tangential position of the pickup stylus relative to the video track information recorded on the disc 12. If the disc is out-of-round, for example, transducer 100 changes the effective length of the pickup arm in consonance with rotation of the disc in a sense to compensate for its eccentricity.

A preferred implementation of processor 28 for NTSC standard players is disclosed in the U.S. Patent application of G. D. Pyles, J. A. Wilber and T. J. Christopher entitled "FAST RECOVERY SQUELCH CIRCUIT FOR A VIDEO DISC PLAYER" Ser. No. 68,015 filed Aug. 20, 1979 and now U.S. Pat. No. 4,286,290. A suitable implementation of processor 28 for PAL standard players is disclosed in the U.S. Patent application of J. G. Amery entitled "CHROMINANCE TRANSCODER" Ser. No. 154,597 filed May 29, 1980 and now U.S. Pat. No. 4,314,273.

A transducer (commonly called an "arm stretcher" transducer) suitable for providing the function of transducer 32 is described, for example, in U.S. Pat. No. 3,882,267 entitled "VIDEO PLAYBACK SYSTEM TRACKING ARM AND PICKUP ASSEMBLY" which issued to M. A. Leedom, May 6, 1975. Another example is U.S. Pat. No. 3,983,318 entitled "VELOCITY CORRECTION SYSTEM WITH DAMPING MEANS" which issued to M. E. Miller and J. G. Amery, Sept. 28, 1976.

The remaining elements (outlined in phantom) of the video disc player of FIG. 1 comprise what will be referred to hereinafter as a "burst killer" 100. Two important functions of burst killer 100 are: (1) identifying the video signal recovered from disc 12 as being monochrome or color; and (2) if monochrome, effectively removing the burst component from the output signal at terminal 22.

The identifying function is fully automatic and performed on a field-by-field basis. This provides an advantage in that no user interaction with the player is required as would be the case, for example, if a manual switch were provided for activating the burst killer. An advantage of providing identification on a field-by-field basis is that discs having mixed monochrome-color programming will always cause the burst killer to be activated at the appropriate time. Such would not be the case, for example, if monochrome-color identification were provided by either encoding the record carrier or jacket with some sort of marking such as a dimple, depression or hole to be sensed by a suitable device or, alternatively, encoding only the initial portion of the disc itself with a suitable signal. Again, the advantage of deleting burst from the player output is that the player will produce consistent quality monochrome pictures when used with color or "black and white" TV receivers.

Considering now the details of burst Killer 100, automatic monochrome-color (M-C) identification on a field-by-field basis is provided by the elements numbered 102–114. Element 102 is a vertical sync detector (VS DET) having an input coupled to the luminance signal output of filter 26 and an output coupled via a cascade connection of two monostable multivibrators, 104 and 106, to one input of gate 108 the other input of which is coupled to the chrominance signal output of filter 26. The output of gate 108 is coupled to a cascade connection comprising, in the order named, a tuned circuit 110, a diode detector 112 and a monostable multivibrator 114. Multibrator 114, as will be explained, generates the M-C identification signal when in its quasi-stable state.

In the following discussion of the operation of the M-C identifier (102–114) portion of burst killer 100 it will be assumed that disc 12 is recorded with a mixture of monochrome and color program material (e.g., a color introduction to a monochrome film or the movie "THE WIZARD OF OZ" in which the beginning and ending are both monochrome but the middle is in color). Since processor 28 requires burst, as previously explained, it will be assumed that burst is present in the signal recovered from disc 12 for both types of programming material. It will also be assumed that a selected line of the vertical interval of each field (e.g., line 16 of field one and the corresponding line 279 of field two) contains a chrominance signal for identifying whether the following active scan lines represent monochrome or color program material.

A preferred chrominance signal is one having a phase relative to burst representative of the color blue and an amplitude at or near the maximum burst amplitude so that if the line was viewed on a TV monitor it would appear highly saturated (i.e., very dark blue). The reason for this choice of M-C coding is that line 16 (or 279) may be visible at the top of the picture of a television receiver which exhibits "underscanning" (i.e., less than a full height raster). Since burst will be present on line 16 (or 279) and M-C identification occurs during the line, the TV receiver color killer circuits will not be activated and at least one line will be visible in color. It has been found that a line of highly saturated blue is much less perceptable to viewers than other hues or lighter shades of blue. Accordingly, the viewer should not be aware of the presence of the M-C identification signal even though the television receiver may be underscanned.

With the above assumptions in mind, detection of the M-C identification signal is as follows. When disc 12 is played, each vertical synchronizing (VS) pulse of the luminance signal provided by filter 26 is detected by VS detector 102 thereby triggering multivibrator 104. The quasi-stable state of multivibrator 104 is selected to last from the instant of detection of the vertical interval pulse to the beginning of line 16 (or 279) whereupon multivibrator 106 is triggered. The quasi-stable state of multivibrator 106 is selected to last about one line (e.g., about 63 microseconds) thereby enabling gate 108 during line 16 (or 279). Once enabled, gate 108 applies the "line of blue" chrominance signal to tuned circuit 110 which is resonant at the buried subcarrier frequency (1.53 MHz, NTSC). The output of circuit 110 is detected by diode detector 112 which, in turn, triggers monostable multivibrator 114.

The quasi-stable state of multivibrator 114 determines the length of time that burst is deleted from the player output signal. A preferred period is about one field which assures that burst is removed from the player output signal for at least the remaining "active scan lines" (i.e., the normally viewable raster lines) of the field in which the "line of blue" was detected. The period could, however, be substantially longer (e.g., one or more frames).

As an alternative to controlling the period of the M-C identification signal by a monostable multivibrator, one could use a bistable multivibrator instead. If so, the "set" or clock input terminal thereof would be connected to the output of diode detector 112 and the reset input thereof would be coupled to the output of VS detector 102. Using a bistable rather than a monostable multivibrator eliminates any uncertainty as to the M-C identification signal period.

The remaining elements 150–160 of burst killer 100 comprises a burst clamping means (150,152) responsive when enabled for effectively removing the color burst component of the video signal recovered from disc 12 from the processed video signal produced by the player at terminal 22 and a timing means (154-160) responsive to a horizontal synchronizing component of the recovered video signal and to the M-C identification signal for activating the burst clamping means.

The burst clamping means of FIG. 1 comprises a switch 150 coupled between the video modulation signal input terminal of TV modulator 20 and the output of a blanking level reference voltage supply 152. The switch 150 may be a relatively simple signal throw (SPST) switch, as shown, where the output impedance of summing circuit 30 is high as compared with that of the blanking level reference and the switch impedance when turned on. Preferably the switch is a bipolar or field effect transistor or some other electronic switching device. Where the output impedance of summing circuit 30 is relatively low, it is desirable that switch 150 be of the single pole double throw type arranged to open the circuit between summing circuit 30 and modulator 20 and to close the circuit between modulator 30 and reference 152 when activated.

In operation, when switch 150 is closed, the input of TV modulator 20 is maintained at blanking level. Closure of switch 150 is effected only during the so called "back porch" interval of the horizontal synchronizing pulse period when the program material is monochrome. Accordingly, the burst component present at the output of chrominance processor 28 (for both monochrome and color program material) is effectively removed from the player output signal at terminal 22.

Timing signals for controlling switch 150 are provided by a horizontal synchronizing pulse detector 154, a cascade connection of two monostable multivibrators 156 and 158 and a gate 160. The input of detector 154 is coupled to the luminance signal output of filter 26 whereby detector 154 produces a trigger pulse in response to each horizontal synchronizing pulse. The output of detector 154 supplies the trigger pulses to the input of monostable multivibrator 156 which has a quasi-stable state on the order of the sync tip period. Accordingly, when multivibrator 156 returns to its stable state multivibrator 158 is triggered at about the beginning of the back porch interval of the horizontal synchronizing pulse. The period or quasi-stable state of multivibrator 158 is equal to or slightly greater than the color burst interval and since it is triggered just prior to the beginning of burst an output pulse is produced coincident with burst. Gate 160 forms the logical product (AND) of the M-C identification signal and the pulses produced by multivibrator 158. Accordingly, if the M-C identification signal is present (signifying a monochrome program field) gate 160 is primed and the pulses produced by multivibrator 158 are applied to switch 150 to effect closure thereof and thus effectively removing burst from the player output terminal 22 as long as the M-C identification signal is present. When the M-C identification signal is absent (signifying a color program field) gate 160 is disabled whereby switch 150 is maintained in an open condition and burst appears at the output 22 of the player.

FIG. 2 illustrates a preferred application of the principles of the invention to a video disc player of the kind including a microprocessor controller for providing various supervisory control functions (e.g., control of the pickup transducer position, elevation, velocity and direction of movement relative to disc 12). For purposes of the present invention the microprocessor controller provides the function of color-monochrome field identification in burst killer 100. To simplify the explanation, the other control functions which may be provided by the microprocessor controller are not illustrated.

Controller 200 is preferably of the kind described by C. B. Dieterich in his U.S. patent application, Ser. No. 84,393 filed Oct. 12, 1979 and entitled "VIDEO DISC SYSTEM" and now U.S. Pat. No. 4,308,557. Controller 200 receives clock and data signals from processor 28 and is preferably interfaced therewith by means of a PCM detector (not shown) as described in C. D. Dieterich's U.S. patent application entitled "PCM DETECTOR" Ser. No. 125,641 filed Feb. 28, 1980 and now U.S. Pat. No. 4,275,416.

As proposed in the Dieterich system application, a selected line during the vertical interval of each field recorded on disc 12 contains pulse code modulated data. In odd fields the selected line is number 17 and in even fields it is number 280. The data is entered or "loaded" into controller 200 by means of the clock signal which is of the buried subcarrier frequency (1.53 MHz) and synchronous with the data. Within controller 200 the data is checked for validity by means of error detection circuitry and, if no errors are found, is operated upon by the controller for providing the aforementioned supervisory control functions.

In the code proposed by Dieterich a 13 bit Barker code is used as a PCM decomutation start code to minimize framing errors. This is followed by a 13 bit error check code to minimize bit errors, a 27 bit information code and then 24 bits used for video field and band identification.

In practicing the present invention, a selected one of the 27 bits of the information code is used for identification of the subsequent field as being monochrome or color. The read only memory (ROM) portion of controller 200 is permanently programmed with the identity (i.e., which one of 27 information bits) and the meaning (color or monochrome) of the selected bit. In operation, the controller ALU (arithmetic and logic unit) interprets the received bit under ROM program control and either sets or resets flip-flop 202 depending on the value (one or zero) of the received bit. As an example, assume that information bit number 1 is recorded on disc 12 at a logic 1 level to signify that the current field is monochrome. When the data of line 17 (or 280) is received, verified and processed by controller 200, flip-flop 202 will be set. If the information bit 1 of line 280 (or 17) of the next field is also logic 1 then flip-flop 202 will remain set. Conversely, if the program material changes from monochrome to color for the next field, information bit 1 will change from logic 1 to logic 0 and flip-flop 202 will be reset. Accordingly, the state of flip-flop 202 provides an indication of whether the active scan lines of any given field represent a color or a monochrome program.

The M-C identification signal produced by flip-flop 202 primes gate 160 during each monochrome field of the program material reproduced from disc 12. Gate 160 is then enabled by horizontal synchronizing pulses supplied thereto by H-S detector 154 thereby triggering multivibrators 156 and 158 as previously described. The pulse produced by multivibrator 158 turns on common emitter connected transistor Q1 during the burst interval of each H-S pulse. The collector of Q1 is coupled to the chrominance signal output of processor 28 whereby Q1 provides a shunt path to ground for the burst signal. Alternatively, Q1 or some other suitable transmission gate could be coupled in series in the path between processor 28 and summing circuit 28 and achieve the same result by inverting the polarity of its control signal. In other words, in this example of the invention burst may be effectively removed from the processed video output signal at terminal 22 by either clamping the chrominance input of circuit 30 to ground reference or by open circuiting the chrominance input of circuit 30. In either case the burst component of the chrominance signal is interrupted without disturbance of the luminance component. The same principles of burst elimination may be applied to the example of FIG. 1 and vice versa.

What is claimed is:
1. A video disc player, comprising:
    turntable means for rotating a video disc record;
    signal processing means for recovering a video signal from said record and producing a processed video output signal for application to a television receiver, said recovered video signal including a color burst component for both monochrome and color program information recorded on said record;
    first means responsive when activated for effectively removing the color burst component of said recovered video signal from said processed video output signal;
    second means for providing a monochrome-color identification signal; and
    third means responsive to a horizontal synchronizing component of said recovered video signal and to said monochrome-color identification signal for activating said first means.
2. A video disc player as recited in claim 1 wherein said second means comprises means for deriving said monochrome-color identification signal from an analog or digital signal manifestation of said recovered video signal.

3. A video disc player as recited in claim 2 wherein said signal manifestation is timed to occur during the vertical interval of said recovered video signal and wherein said second means includes means for providing said monochrome-color identification signal for a time period inclusive of at least the active scan interval of at least one video field.

4. A video disc player as recited in claim 3 wherein said signal processing means includes modulator means responsive to a base band composite video signal supplied thereto inclusive of luminance and chrominance components for producing said processed video output signal and wherein said first means comprises means for clamping said base band composite video signal to a predetermined reference level in response to activation by said third means.

5. A video disc player as recited in claim 3 wherein said signal processing means includes modulator means responsive to a base band composite video signal supplied thereto for producing said processed video output signal, wherein said composite video signal is formed by summing means for summing a luminance signal and a chrominance signal supplied thereto and wherein said first means comprises means for effectively preventing application of said chrominance signal to said summing means in response to activation by said third means.

6. A video disc player, comprising:
turntable means for rotating a video disc record;
signal recovery means for recovering a video signal from said record, the recovered video signal including a color burst component for both monochrome and color program information recorded on said disc record;
video processor means responsive to said color burst component for producing a correction signal for effecting time base correction of said video signal;
modulator means responsive to the time base corrected video signal for producing a modulated picture carrier wave output signal for application to a television receiver;
first means responsive to an activating signal supplied thereto for effectively removing the color burst component of recovered video from the modulated picture carrier wave output signal;
second means for providing a monochrome-color identification signal; and
third means responsive to a horizontal synchronizing component of the recovered video signal and to said monochrome-color identification signal for supplying said activating signal to said first means.

7. A video disc player as recited in claim 6 wherein said second means comprises means for deriving said monochrome-color identification signal from an analog or digital signal manifestation of said recovered video signal.

8. A video disc player as recited in claim 7 wherein said analog or digital signal manifestation occurs at a predetermined time in the vertical interval of said recovered video signal and wherein said second means includes means for detecting said analog or digital signal during said predetermined time and generating said monochrome-color identification signal prior to the end of the vertical interval.

9. A video disc player, comprising:
turntable means for rotating a video disc record;
signal recovery means for recovering a video signal from said record, said video signal including a color burst component for both monochrome and color program information recorded on said disc record;
video processor means responsive to said color burst component for producing a correction signal for effecting time base correction of said video signal;
modulator means responsive to the time base corrected video signal for producing a modulated picture carrier wave output signal for application to a television receiver;
circuit means responsive to an activating signal supplied thereto for effectively removing the color burst component of said recovered video signal from said modulated picture carrier wave output signal;
microprocessor controller means responsive to said recovered video signal for providing a monochrome-color identification signal; and
timing means responsive to a horizontal synchronizing component of said recovered video signal and to said monochrome-color identification signal for supplying said activating signal to said circuit means.

10. A video disc player, comprising:
turntable means for rotating a video disc record;
signal recovery means for recovering a video signal from said record, said video signal including a color burst component for both monochrome and color program information recorded on said disc record;
video processor means responsive to said color burst component for producing a correction signal for effecting time base correction of said video signal;
modulator means responsive to the time base corrected video signal for producing a modulated picture carrier wave output signal for application to a television receiver;
burst clamping means, responsive when activated, for clamping at least the chrominance component of said time base corrected video signal to a predetermined signal level prior to application thereof to said modulator means;
circuit means for producing a monochrome-color identification signal; and
timing circuit means responsive to a horizontal synchronizing component of said video signal and to said monochrome-color identification signal for activating said burst clamping means during the color burst interval of said video signal to effectively remove said burst component from said modulated picture carrier wave output signal when said program information is monochrome.

* * * * *